United States Patent
Gross, Jr.

(10) Patent No.: US 6,725,018 B1
(45) Date of Patent: Apr. 20, 2004

(54) SIGNAL IMPROVEMENT BY PREDISTORTION/POSTDISTORTION OF PROGRAMMABLE CONVERTER

(75) Inventor: George Francis Gross, Jr., Reading, PA (US)

(73) Assignee: Agere Systems Inc., Allentown, PA (US)

(*) Notice: Subject to any disclaimer, the term of this patent is extended or adjusted under 35 U.S.C. 154(b) by 513 days.

(21) Appl. No.: 09/663,852

(22) Filed: Sep. 18, 2000

Related U.S. Application Data

(62) Division of application No. 08/929,817, filed on Sep. 15, 1997, now Pat. No. 6,173,161.
(60) Provisional application No. 60/026,961, filed on Sep. 25, 1996.

(51) Int. Cl.[7] .............................. H04B 1/00; H04B 15/00
(52) U.S. Cl. ................ 455/67.3; 455/67.11; 455/67.13; 455/67.14; 455/69; 455/296; 375/227; 375/232
(58) Field of Search .................. 455/67.13, 69, 455/70, 88, 555, 283, 277.2, 296, 310, 311, 63.1, 67.11, 67.14; 375/224–228, 229–233, 295, 316

(56) References Cited

U.S. PATENT DOCUMENTS

| | | | | |
|---|---|---|---|---|
| 4,317,206 A | * | 2/1982 | Nossen | 375/224 |
| 4,340,854 A | * | 7/1982 | Jones et al. | 324/623 |
| 4,890,300 A | * | 12/1989 | Andrews | 375/297 |
| 5,237,332 A | * | 8/1993 | Estrick et al. | 342/174 |
| 5,251,328 A | * | 10/1993 | Shaw | 455/73 |
| 5,361,400 A | * | 11/1994 | Kazecki et al. | 455/63.1 |
| 5,463,395 A | * | 10/1995 | Sawai | 341/156 |
| 5,696,508 A | * | 12/1997 | Gross et al. | 341/118 |
| 5,731,775 A | * | 3/1998 | Gross et al. | 341/155 |
| 6,173,161 B1 | * | 1/2001 | Gross, Jr. | 455/67.3 |

* cited by examiner

Primary Examiner—William Trost
Assistant Examiner—Stephen D'Agosta
(74) Attorney, Agent, or Firm—David L. Smith

(57) ABSTRACT

In accordance with the present invention, a communications system transmits a predetermined signal, from a first, sending, end of a communications system to a second, receiving, end of a communications system. The predetermined signal is distorted by the communication system and is received as a distorted signal that is compared to a known version of the originally transmitted signal. A comparison signal related to the difference between the originally transmitted signal (as represented by the known version of the originally transmitted signal) and the distorted predetermined signal as received at the receiving end is employed to adjust the transfer characteristic of a programmable converter to compensate for the distortion introduced by the communication system.

13 Claims, 3 Drawing Sheets

SIGNAL IMPROVEMENT BY PREDISTORTION/POSTDISTORTION OF PROGRAMMABLE CONVERTER

This is a continuation divisional of application Ser. No. 08/929,817, filed on Sep. 15, 1997 now U.S. Pat. No. 6,173,161.

Priority of U.S. Provisional Application Ser. No: 60/026,961 filed Sep. 25, 1996 is hereby claimed.

TECHNICAL FIELD

This application relates generally to signal predistortion/postdistortion to compensate for undesired system distortion of a signal and in particular to closed-loop signal improvement by predistortion/postdistortion of a programmable converter.

BACKGROUND OF THE INVENTION

In many communications applications, a signal is distorted by the hardware and channel over which the signal passes. An example where distortion occurs is a transmission system in a phone loop. Any signal, such as video, voice or data, passing through the phone loop, is subjected to the distortion introduced by the loop.

One prior art technique for eliminating noise in communications systems is taught in U.S. Pat. No. 5,251,328. The disclosed technique predistorts the amplitude of a transmitted signal in a manner which compensates for the amplitude distortion introduced in a portion of the communication channel.

Since a phone loop is formed by available equipment each time a call is placed, the distortion introduced will differ depending upon what equipment is utilized when the call is completed. Accordingly, since the distortion is not predetermined, compensation for distortion also cannot be predetermined.

It would be desirable to have a distortion compensation technique to ascertain the distortion introduced by a communications system so that information transmitted over the communication system, such as voice or data, could be predistorted/postdistorted such that the output signal would be distortion free.

SUMMARY OF THE INVENTION

In accordance with the present invention, a communications system transmits a predetermined signal, from a first, sending, end of a communications system to a second, receiving, end of a communications system. The predetermined signal is distorted by the communications system and received as a distorted signal that is compared to a known version of the originally transmitted signal. The difference between the originally transmitted signal (as represented by the known version of the originally transmitted signal) and the distorted predetermined signal as received at the receiving end, the transmitting end, or both, is employed to adjust a programmable converter at either the receiving end, the transmitting end, or both, to compensate for the distortion introduced by the communications system.

DETAILED DESCRIPTION

Figure 1:
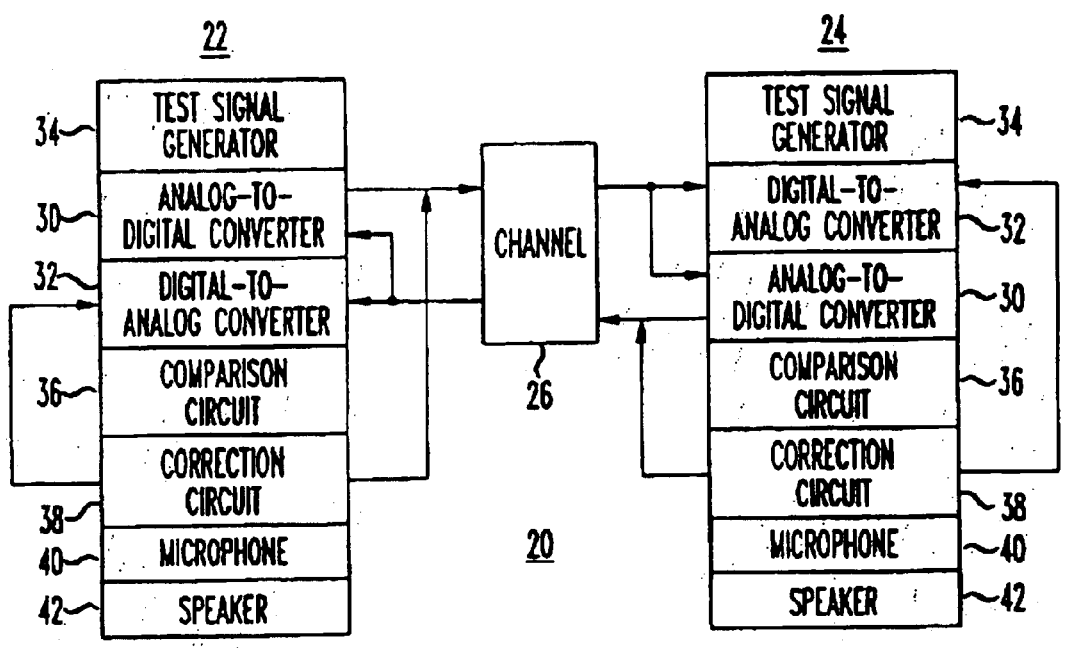
FIG. 1 is a simplified block diagram of a communications system including an illustrative embodiment of a programmable converter for predistorting or postdistorting a signal, in accordance with the present invention.

The block diagram of a communications system 20 in accordance with the present invention shown in FIG. 1. Device 22 is adapted to be coupled to device 24 by way of channel 26. Devices 22 and 24 may be data acquisition systems, set-top video systems, modems or telephones such as a telephone handset or telephone answering device, and may be but are not necessarily identical. Channel 26 is a medium to exchange information between devices 22 and 24 such as optic fiber, copper lines, infrared or a radio channel. For simplicity, other components that may be present are not shown. In an illustrative embodiment in which devices 22 and 24 are telephones, devices 22 and 24 each may include an analog-to-digital converter 30, a digital-to-analog converter 32, a test signal generator 34, a comparison circuit 36, a correction circuit 38, a microphone 40, and a speaker 42. Converters 30 and 32 may be integral and preferably are in accordance with application Ser. No. 08/393,741 entitled, "Comparator-Offset Compensating Converter" filed Feb. 24, 1995, the disclosure of which is hereby incorporated by reference, although the invention is not limited thereto.

Upon establishing a communication link between devices 22 and 24, test signal generator 34 of one of devices 22 and 24, the sending device, sends a predetermined test signal to the other device, the receiving device, over channel 26. Predetermined test signals are known to those skilled in the art and would typically be a signal of appropriate spectral density for the type of data and the channel 26 over which the signal is transmitted. Such a predetermined test signal may be a sine wave, ramp, or take on a sequence of step amplitudes over a frequency range of interest. Comparison circuit 36 of device 22 or 24 receiving the distorted test signal compares the distorted predetermined test signal as received to an ideal version of the predetermined test signal that may be locally stored or generated. The predetermined test signal as received at the receiving device will generally be distorted by the communications system including device 22, channel 26 and device 24. The difference between the predetermined test signal as received and the ideal version of the predetermined test signal is an error signal that represents distortion introduced in the communication system 20, such as by amplifiers, modulators, demodulators, the channel, and other components. This technique in which the error signal is used to compensate for the distortion introduced in communication system 20, is sometimes referred to as training or calibration. In accordance with the illustrative embodiment of the present invention, the error signal is employed to adjust a digital-to-analog converter 32 in device 24, or an analog-to-digital converter 30 in device 22 to compensate for the distortion introduced in communication system 20.

The converter disclosed in application Ser. No. 08/393,741 includes various reference voltage tap point inputs to the comparators that are capable of being adjusted to correct for offset voltage. In this manner, the transfer characteristic of the converter can be adjusted. Individual comparator reference voltage tap point set points are set and stored in a register until a subsequent calibration cycle is initiated. If the subsequent calibration cycle determines that the voltage tap set points should be changed, the voltage tap set points are updated by overwriting the old set points stored in a register with the new set points. The register can be configured to be written either by the correction circuit or by an external source. In a closed-loop system, information related to the required predistortion/postdistortion to compensate for the communications system distortion of the entire communications system can be written to and stored in the register. Once the necessary distortion is determined, it can be introduced by either device 22 or 24. Generally, when introduced by the sending device, the distortion would be predistortion, and when introduced by the receiving device, the distortion would be post distortion.

When correction is applied to a converter that is between the input of the sending device and the output of the receiving device, then both predistortion and postdistortion occur. Alternatively, known component distortion characteristics, such as known distortion characteristics of speaker 42, can also be included in the distortion correction algorithm of distortion correction circuit 38. The output of correction circuit 38 of device 22 can be applied to analog-to-digital converter 30 of device 24, to digital-to-analog converter 32 of device 22, or a portion of the correction can be applied to each of converters 30 and 32 in any combination. Similarly, the output of correction circuit 38 of device 24 can be applied to analog-to-digital converter 30 of device 22, to digital-to-analog converter 32 of device 24, or a portion of the correction can be applied to each of converters 30 and 32 in any combination.

Figure 2:
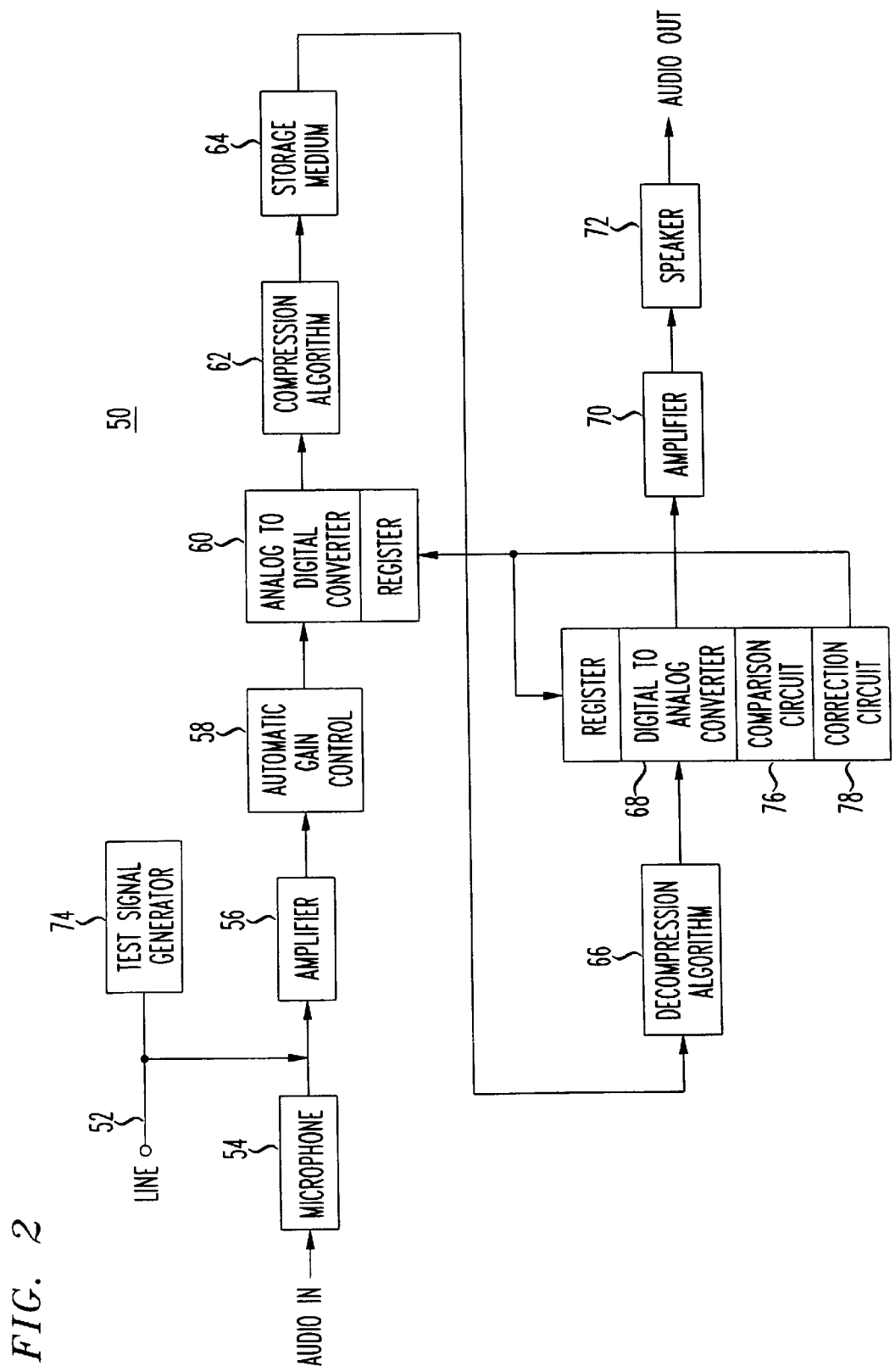
FIG. 2 is a simplified block diagram in greater detail of a communications system of an alternative illustrative embodiment of a programmable converter for predistortion/postdistortion of a signal.

FIG. 2 shows an alternative illustrative embodiment of the invention in which one of devices 22 or 24 of FIG. 1 is a telephone answering device (TAD) 50. TAD 50 is coupled to line 52 representing channel 26 of FIG. 1, and typically includes several additional elements. Microphone 54 permits TAD 50 to be used as a telephone or is used when storing outgoing messages in TAD 50. Amplifier 56 amplifies the signal received from line 52 or microphone 54. Automatic gain control 58 controls the gain of amplifier 56. Analog-to-digital converter 60 converts the analog signal received from automatic gain control 58 to a digital signal that is provided to compression algorithm 62. Compression algorithm 62 compresses the digital signal using any known compression technique so as to reduce the amount of memory required to store a message. The digital output from compression algorithm 62 is provided to a digital storage medium 64 where the message is stored until retrieved. Upon retrieval, the digital output from storage medium 64 passes through decompression algorithm 66. The digital output from decompression algorithm 66 is converted to an analog signal by digital-to-analog converter 68. The analog output from digital-to-analog converter 68 is amplified by amplifier 70 and provided to a transducer such as speaker 72 to produce an audio output.

One or both of converters 60 and 68 have the ability to have their transfer characteristic modified. The transfer characteristic of a converter is the relationship between the input and the output of the converter. The transfer characteristic can be modified in various ways. In the case of an analog-to-digital converter, the transfer characteristic can be modified by adjusting the reference voltage tap point inputs of individual comparators of the converter as disclosed in application Ser. No. 08/393,741. In the case of a digital-to-analog converter, the digital input can be appropriately adjusted.

TAD 50 includes a test signal generator 74 to locally generate a test signal for training or calibration, a comparison circuit 76 to receive the locally generated test signal from test signal generator 74 after the test signal has been distorted by up-stream components in TAD 50, which may also be coupled to line 52 for synchronization and to provide a test signal to line 52. Test signal generator 74 may generate locally an ideal version of the test signal, or may store locally an ideal version of the test signal or both. Synchronization of the locally generated test signal with a received, test signal is known in the art. Comparison circuit 76 receives a test signal from proximate line 52 generated by test signal generator 74 as transferred through amplifier 56, automatic gain control 58, analog-to-digital converter 60, compression algorithm 62, storage medium 64 and decompression algorithm 66. Comparison circuit 76 compares the received, distorted test signal to a locally stored test signal or to a test signal received directly from test signal generator 74, and generates as an output signal a signal that is related to the difference between the two input signals, such as an error signal that is proportional to the difference between the two input signals. The output signal from comparison circuit 76 is provided as an input to correction circuit 78. Correction circuit 78 provides control outputs, typically a multi-bit digital output, that may be used to adjust either analog-to-digital converter 60 or digital-to-analog converter 68. Alternatively, correction circuit 78 control outputs can be apportional between converters 60 and 68 such that a portion of the compensation for distortion occurs in each converter. It is noted that converters 60 and 68 may or may not be independent of each other.

When an incoming message is to be stored in storage medium 64, the correction provided by correction circuit 78 may be used to modify operation of analog-to-digital converter 60 prior to storing the message. Alternatively, correction information provided by the correction circuit 78 may be stored along with a message and employed to modify operation of digital-to-analog converter 68 when the message is retrieved.

When an incoming message is not stored, such as when the TAD 50 is used as a telephone, distortion compensation may still be achieved by bypassing the storage medium, such as providing the output of analog-to-digital converter 60 to the input of digital-to-analog converter 68, and corrections for distortion as described above employing either converter 60 or converter 68 may be achieved.

In this manner, either analog-to-digital converter 60 or digital-to-analog converter 68 may compensate for distortion in a signal processed through TAD 50. When correction circuit 78 provides an output to analog-to-digital converter 60, the correction for distortion introduced by amplifier 56 and automatic gain control 58 is considered postdistortion, while the correction for signal distortion introduced by analog-to-digital converter 60, compression algorithm 62, storage medium 64, decompression algorithm 66 and digital-to-analog converter 68 is considered predistortion. Electrical signals could be monitored at the output of amplifier 70, or an acoustic measurement could be monitored at the output of speaker 72 as analog-to-digital converter 60 is adjusted forming a feedback loop, permitting either converter 60 or 68, in any combination, to also compensate for distortion of components downstream of it in the signal path. Similarly, digital-to-analog converter 68 could be employed to compensate for distortion. Similarly, known component distortion characteristics could be included in the correction algorithm included in correction circuit 78 without the need to measure the distortion.

Figure 3:
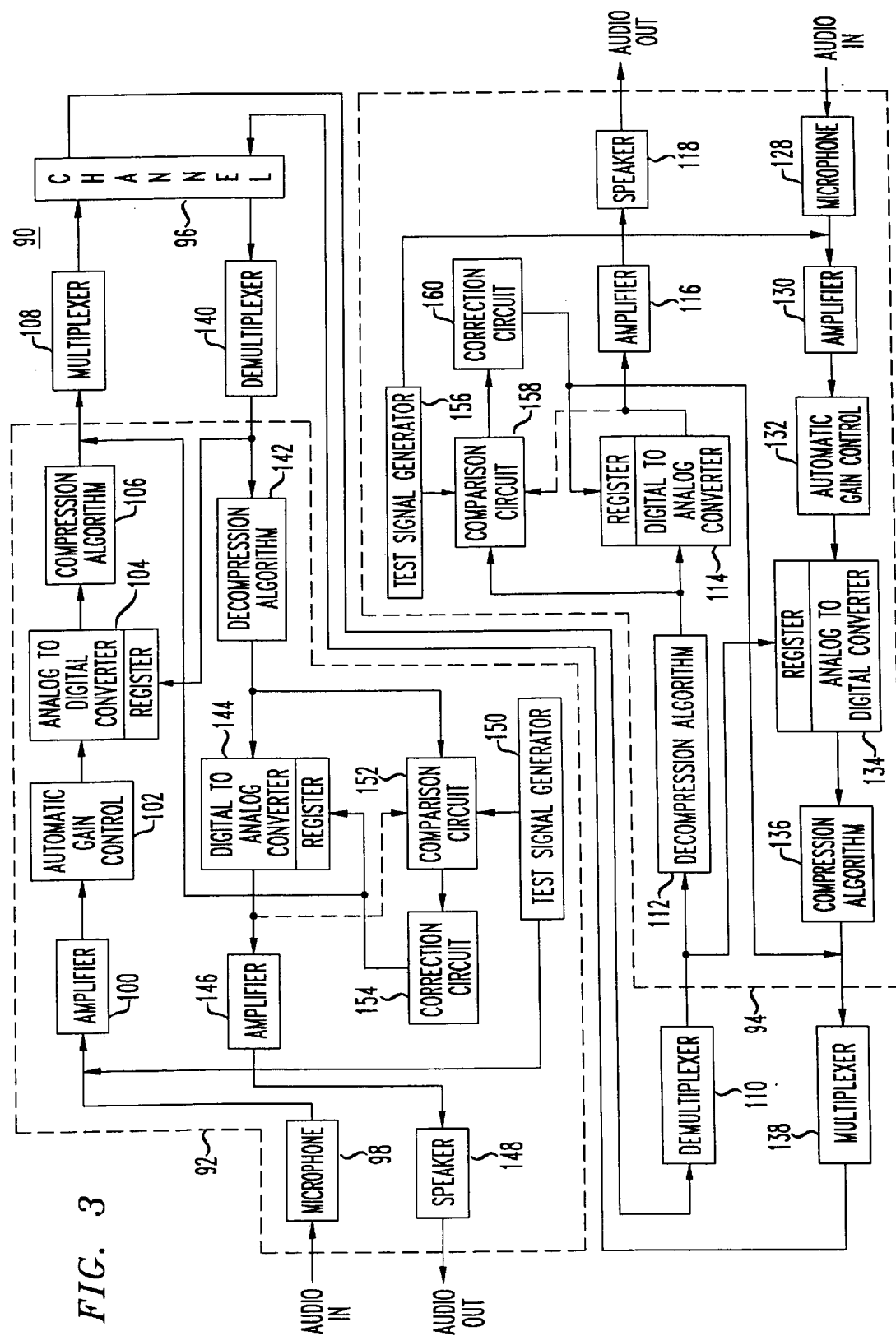
FIG. 3 is a simplified block diagram in greater detail of a communications system of yet another alternative illustrative embodiment of a programmable converter for predistortion/postdistortion of a signal.

A simplified schematic diagram of a closed-loop digital transmission system 90 employing an illustrative embodiment of the invention is shown in FIG. 3. Transmission system 90 includes transceivers 92 and 94 adapted to be coupled over channel 96. Channel 96 may typically be a radio, infrared, or microwave frequency over which digital data is transmitted, a digital telephone line such as integrated services data network (ISDN), copper such as cable or a twisted pair, or fiber.

An audio input received by microphone 98, is amplified by amplifier 100 which is gain controlled by automatic gain control 102. The analog output of automatic gain control 102 is converted to a digital signal by analog-to-digital converter 104. The digital signal output from analog-to-digital converter 104 may be compressed by compression algorithm 106 and be multiplexed by multiplexer 108 before being placed on channel 96. If multiplexed at the sending end, a signal is demultiplexed at the receiving end, such as by demultiplexer 110, then decompressed by a decompression algorithm 112 to provide a decompressed digital signal. Digital-to-analog converter 114 converts the decompressed digital signal to an analog signal which is amplified by amplifier 116 to drive speaker 118. Speaker 118 provides an audio output from transceiver 94 that is a reconstruction of the audio signal input to microphone 98 of transceiver 92. A reciprocal path is provided from the microphone input to transceiver 94 to the speaker of transceiver 92.

Upon establishing a communication link between transceivers 92 and 94 over channel 96, the test signal generator of one, or both, of transceivers 92 and 94 sends a predetermined test signal to the other transceiver over channel 96. The transceiver sending the test signal could be either the transceiver initiating the communication link or the transceiver responding to the communication link being coupled. By way of example, when transceiver 92 sends the test signal, the test signal is generated by test signal generator 150 and provided as an input to transceiver 92. To maximize the components for which the invention compensates for distortion, the test signal is injected as close to the originating audio signal as possible, such as being coupled to the input of amplifier 100. The test signal produced by test signal generator 150 is transmitted over channel 96 to transceiver 94 and received as a signal distorted by portions of transceiver 92, channel 96, and portions of transceiver 94. The received distorted test signal, as decompressed by decompression algorithm 112, is received by digital-to-analog converter 114. Comparison circuit 158 compares the distorted test signal to a locally generated test signal generated by test signal generator 156, or to a known, ideal, version of the test signal that may be stored in comparison circuit 158, and generates as an output a signal related to the difference therebetween, such as the difference. The comparison circuit output signal is provided to correction circuit 160. Correction circuit 160 generates correction information typically in a multibit digital form to be used to adjust digital-to-analog converter 114 in transceiver 94, or the correction information is transmitted over channel 96 to transceiver 92 where it is used to adjust analog-to-digital converter 104.

When a test signal generated by test signal generator 156 of transceiver 94 is input such as to amplifier 130 and transmitted over channel 96 to transceiver 92, it is received as a signal distorted by portions of transceiver 94, channel 96, and portions of transceiver 92. The received distorted test signal is received by digital-to-analog converter 144. Comparison circuit 152, compares the distorted test signal to a locally generated test signal generated by test signal generator 150, or to a known, ideal, version of the test signal that may be stored such as in comparison circuit 152, and generates as an output a signal related to the difference therebetween, such as the difference, is provided to a correction circuit 154. Correction circuit 154 generates correction information typically a multibit digital form to be used to adjust digital-to-analog converter 144 in transceiver 92, or the correction information is transmitted over channel 96 to transceiver 94 where it is used to adjust analog-to-digital converter 134.

When correction is applied to a converter that is between the input of the sending device and the output of the receiving device, then both predistortion and postdistortion occur. Alternatively, known component distortion characteristics can also be included in the distortion correction algorithm of a distortion correction circuit on either the sending or the receiving end. The output of correction circuit 154 can be applied to digital-to-analog converter 144, or transmitted over channel 96 and applied to analog-to-digital converter 134. Alternatively, the output of the output of correction circuit 154 can be apportioned between converters 144 and 134 such that a portion of the compensation for distortion occurs in each converter. Similarly, the output of correction circuit 160 can be applied to digital-to-analog converter 114, or transmitted over channel 96 and applied to analog-to-digital converter 104. Alternatively, the output of correction circuit 160 can be apportioned between converters 114 and 104 such that a portion of the compensation for distortion occurs in each converter.

While the illustrative embodiments of the invention have been described as injecting a predetermined test signal into a device at a first particular location, or extracting a distorted test signal from a device at a second particular location, the invention is not limited thereto. The location of signal injection or extraction merely impacts the extent to which distortion due to components in the communication system are compensated for. While the illustrative embodiments of the invention disclose one of the inputs to a comparison circuit being the input to an associated digital-to-analog converter, those skilled in the art could provide the output of the converter, as shown in phantom lines in FIG. 3, as the input to a modified comparison circuit.

Although an illustrative embodiment of the invention has been described as storing locally an ideal version of the test signal, it is within the scope of the invention that the ideal version of the test signal could be generated locally.

The invention claimed is:

1. A method of operating a converter for converting a received signal from a first form to a second form to provide an output signal, the converter including a resistor string coupled between a first terminal and a second terminal, the resistor string comprising a plurality of resistors, intermediate taps at the junctions of resistors in the resistor string, and at least one comparator with first and second inputs and an output, the first input providing a tap point that is capable of being selectively coupled to preselected ones of the intermediate taps, the second input capable of being coupled to an analog input, the method comprising the steps of:

receiving a distorted signal at an input to the converter where the distorted signal originated as a predetermined signal;

comparing the converter output signal produced in response to the received distorted signal to a converter output signal produced in response to the predetermined signal to generate information representative of the distortion; and adjusting the tap points of the at least one comparator in response to the information representative of the distortion, whereby the output of the converter is compensated for signal distortion.

2. A method of operating a converter as recited in claim 1, further comprising the step of:

prior to receiving a distorted signal, preadjusting the tap point of at least one comparator in the converter to calibrate the converter.

3. A method of operating a converter for converting a received signal from a first form to a second form to provide an output signal, the converter including a resistor string coupled between a first terminal and a second terminal, the resistor string comprising a plurality of resistors, intermediate taps at junctions of resistors in the resistor string, as well as junctions of resistors and the first and second terminal, a plurality of comparators each having first and second inputs and an output, the method comprising the steps of:

comparing the converter output signal produced in response to the received distorted signal to a converter output signal produced in response to the predetermined signal to generate a compared signal related to the distortion; and adjusting the tap point of at least one of the comparators among the respective preselected ones of the intermediate taps in the converter in response to the compared signal, whereby the output of the converter is compensated for signal distortion.

4. A method of operating a converter as recited in claim 3, further comprising the step of:

prior to receiving a distorted signal, preadjusting the tap point of at least one comparator in the converter to calibrate the converter.

5. A method of operating a system for compensating for distortion introduced by components in the system, the method comprising the steps of:

generating a predetermined signal at a sending end of a transmission medium of the system;

transmitting the predetermined signal over the transmission medium wherein the predetermined signal is subjected to distortion;

receiving a distorted signal at a receiving end of the transmission medium;

converting, at the receiving end of the transmission medium, the received distorted signal from a first form to a second form;

quantifying the distortion in the second form of the received distorted signal; and establishing a correction based on the quantified distortion, to compensate for distortion introduced by the transmission medium of the system.

6. A method of operating a system as recited in claim 5, wherein the step of quantifying the distortion comprises:

comparing the received distorted signal in the second form to a predetermined test signal to generate information representative of the distortion introduced by the transmission medium of the system.

7. A system for compensating for distortion of a signal transmitted between a sending end and a receiving end of a communication system, comprising:

a transmitting converter at the sending end for sending an input signal and for generating a first output signal;

a receiving converter at the receiving end for receiving a distorted version of the generated output signal and for comparing the received distorted version of the generated output signal to a predetermined second converter output signal to generate a signal representative of distortion;

adjusting the receiving converter in response to the signal representative of distortion to compensate for signal distortion caused by the communication system.

8. A system for compensating for distortion as recited in claim 7, wherein the input signal to the transmitting converter comprises:

a predetermined test signal.

9. A method of operating a system to compensate for distortion introduced by components in the system after distortion, the method comprising:

generating a predetermined signal at a sending end of the system;

transmitting the predetermined signal over a transmission medium wherein the predetermined signal is subjected to distortion;

receiving a distorted predetermined signal at a receiving end of the transmission medium;

converting, at the receiving end of the transmission medium, the received distorted predetermined signal from a first form to a second form;

quantifying an amount of distortion in the second form of the received distorted predetermined signal;

applying a correction based on the quantified amount of distortion, to a signal subsequently received at the receiving end of the transmission medium, to compensate for the quantified amount of distortion.

10. A method of operating a system to compensate for distortion introduced by components in the system after distortion as recited in claim 9, wherein the quantifying the amount of distortion comprises:

comparing the received distorted predetermined signal at the receiving end of the transmission medium to a locally stored predetermined signal to generate information representative of the amount of distortion caused by the transmission medium.

11. A system for compensating for distortion of a signal transmitted caused between a sending end and a receiving end of a communication system after distortion, comprising:

a transmitting converter at the sending end adapted to generate a transmitted signal;

a receiving converter at the receiving end adapted to receive a distorted version of the transmitted signal, and to compare the received distorted version of the transmitted signal to a locally stored undistorted version of the signal to generate information relating to an amount of distortion caused by the communication system; and adjusting the receiving converter in response to the generated information relating to the amount of distortion.

12. A system for compensating for distortion of a signal transmitted caused between a sending end and a receiving end of a communication system after distortion as recited in claim 11, wherein the transmitted signal generated by the transmitting converter comprises:

a predetermined test signal.

13. A system for compensating for distortion of a signal transmitted caused between a sending end and a receiving end of a communication system after distortion as recited in claim 11, wherein the system comprises:

a telephone loop.

* * * * *